(12) United States Patent
Peyrard et al.

(10) Patent No.: US 11,922,133 B2
(45) Date of Patent: Mar. 5, 2024

(54) PROCESSOR AND METHOD FOR PROCESSING MASK DATA

(71) Applicants: STMicroelectronics (Grenoble 2) SAS, Grenoble (FR); STMicroelectronics (Rousset) SAS, Rousset (FR)

(72) Inventors: Rene Peyrard, Voiron (FR); Fabrice Romain, Rians (FR); Jean-Michel Derien, Grenoble (FR); Christophe Eichwald, Sassenage (FR)

(73) Assignees: STMicroelectronics (Rousset) SAS, Rousset (FR); STMicroelectronics (Grenoble 2) SAS, Grenoble (FR)

( * ) Notice: Subject to any disclaimer, the term of this patent is extended or adjusted under 35 U.S.C. 154(b) by 269 days.

(21) Appl. No.: 17/038,774

(22) Filed: Sep. 30, 2020

(65) Prior Publication Data
US 2021/0109711 A1 Apr. 15, 2021

(30) Foreign Application Priority Data

Oct. 11, 2019 (FR) ...................................... 1911348

(51) Int. Cl.
*G06F 7/57* (2006.01)
*G06F 7/76* (2006.01)

(52) U.S. Cl.
CPC ................ *G06F 7/57* (2013.01); *G06F 7/764* (2013.01)

(58) Field of Classification Search
CPC . G06F 7/57; G06F 7/575; G06F 7/764; G06F 2207/7219; G06F 2207/7223; G06F 2207/7233; G06F 2207/7236; G06F 21/00; G06F 21/60; H04L 9/003; H04L 9/002; H04L 2209/04; H04L 2209/046; H04L 2209/12
See application file for complete search history.

(56) References Cited

U.S. PATENT DOCUMENTS

| 6,173,393 B1 | 1/2001 | Palanca et al. |
| 7,334,133 B2 | 2/2008 | Goubin |

(Continued)

FOREIGN PATENT DOCUMENTS

| CN | 103959237 A | 7/2014 |
| CN | 106575217 A | 4/2017 |

(Continued)

OTHER PUBLICATIONS

Philippaerts et al. on "Code Pointer Masking: Hardening Applications against Code Injection Attacks" In: Holz, T., Bos, H. (eds) Detection of Intrusions and Malware, and Vulnerability Assessment. DIMVA 2011. Lecture Notes in Computer Science, vol. 6739 https://doi.org/10.1007/978-3-642-22424-9_12 (Year: 2011).*

(Continued)

*Primary Examiner* — Emily E Larocque
*Assistant Examiner* — Carlo Waje
(74) *Attorney, Agent, or Firm* — Slater Matsil, LLP

(57) ABSTRACT

A method includes processing, by an arithmetic and logic unit of a processor, masked data, and keeping, by the arithmetic and logic unit of the processor, the masked data masked throughout their processing by the arithmetic and logic unit. A processor includes an arithmetic and logic unit configured to keep masked data masked throughout processing of the masked data in the arithmetic and logic unit.

23 Claims, 6 Drawing Sheets

(56) References Cited

U.S. PATENT DOCUMENTS

| | | |
|---|---|---|
| 2004/0254966 A1 | 12/2004 | Sunwoo et al. |
| 2005/0114610 A1 | 5/2005 | Robinson et al. |
| 2005/0198474 A1 | 9/2005 | Nancekievill et al. |
| 2007/0071235 A1* | 3/2007 | Fujisaki ............... H04L 9/003 380/28 |
| 2008/0040414 A1 | 2/2008 | Kuenemund |
| 2008/0126456 A1 | 5/2008 | Kuenemund |
| 2009/0112896 A1* | 4/2009 | Golic ............... H04L 9/003 |
| 2010/0235417 A1 | 9/2010 | Baek |
| 2010/0281092 A1 | 11/2010 | Kuenemund |
| 2010/0332578 A1 | 12/2010 | Gopal et al. |
| 2013/0275730 A1 | 10/2013 | Ould-Admed-Vall et al. |
| 2014/0019467 A1 | 1/2014 | Itoh et al. |
| 2014/0379773 A1 | 12/2014 | Rubanovich et al. |
| 2015/0172042 A1 | 6/2015 | Karroumi et al. |
| 2015/0278555 A1 | 10/2015 | Melzani |
| 2019/0050204 A1* | 2/2019 | Hutter ............... G06F 7/588 |
| 2019/0379529 A1* | 12/2019 | Meyer ............... H04L 9/008 |
| 2021/0097206 A1* | 4/2021 | Wierzynski ............... H04L 9/08 |
| 2021/0109708 A1 | 4/2021 | Peyrard et al. |
| 2021/0109713 A1 | 4/2021 | Peyrard et al. |
| 2021/0109714 A1 | 4/2021 | Peyrard et al. |
| 2021/0157586 A1* | 5/2021 | Vigilant ............... H04L 9/002 |
| 2021/0165633 A1 | 6/2021 | Guilley et al. |

FOREIGN PATENT DOCUMENTS

| | | |
|---|---|---|
| CN | 108604987 A | 9/2018 |
| CN | 109255967 A | 1/2019 |
| WO | 2019046651 A2 | 3/2019 |

OTHER PUBLICATIONS

Elke De Mulder, et al., "Protecting RISC-V against Side-Channel Attacks," Jun. 2, 2019, 4 pages, XP058435200.

Goubin L Ed-Koc C K, et al., "A Sound method for switching between boolean and arithmetic masking." Cryptographic Hardware and Embedded Systes. 3rd International Workshop, Sep. 20, 2001, 13 pages, XP001061156.

Nakatsu, D., et al., "Combination of SW Countermeasure and CPU Modification on FPGA against Power Analysis," International Conference on Financial Cryptography and Data Security, Aug. 24, 2010, pp. 258-272, XP04742875.

Patterson, David A., et al., "Computer Organization and Design: The Hardware/Software Interface", Elsevier Inc., 5th Edition, https://ict.iitk.ac.in/wp-content/uploads/CS422-Computer-Architecture-ComputerOrganizationAnd Design, Sep. 26, 2013, Digital 2014, 302 pages.

Wikipedia, "Status register," downloaded May 19, 2020, https://en.wikipedia.org/w/index.php?title=Status_register&oldid=897722534, 4 pages.

Bache, F., et al., "SPARX—A Side-Channel Protected Processor for ARX-based Cryptography," IEEE, 2017 Design, Automation and Test in Europe (Date) Conference & Exhibition, Mar. 27-31, 2017, 6 pages.

Gérard, F. et al., "An Efficient and Provable Masked Implementation of qTESLA," IACR, Jun. 2, 2019, 21 pages.

Gross, H., et al., "Concealing Secrets in Embedded Processors Designs," 15th Smart Card Research and Advanced Application Conference—CARDIS 2016, Nov. 7-9, 2016, 16 pages.

Patterson, David A., et al., "Computer Organization and Design: The Hardware/Software Interface", Fifth Edition, Chapter 2.4 pp. 73-79, 2014. u Retrieved from <https://ict.iitk.ac.in/wp-content/uploads/CS422-Computer-Architecture-ComputerOrganizationAnd Design 5th Edition, Sep. 2013, 302 pages.

Mead, "Bit Manipulation", Retrieved from <https://azrael.digipen.edu/-mead/www/Courses/CS225/BitManipulations.html> Retrieved on Aug. 31, 2022, 8 pages.

* cited by examiner

PROCESSOR AND METHOD FOR PROCESSING MASK DATA

CROSS-REFERENCE TO RELATED APPLICATIONS

This application claims the benefit of French Application No. 1911348 filed on Oct. 11, 2019, which application is hereby incorporated herein by reference.

TECHNICAL FIELD

The present disclosure relates generally to electronic systems, circuits and methods, and more specifically to processors and methods. The present disclosure more specifically relates to processors configured to process masked data, and methods of operating thereof.

BACKGROUND

A processor is an electronic component, present in many electronic systems and circuits, that is configured to process data by executing commands and instructions from computer programs.

In some cases, a processor may have to process secret data. These secret data are generally encrypted, for example by masking.

It would be desirable to be able to improve, at least partially, certain aspects of known processors.

SUMMARY

There is a need in the art for more reliable processors.

There is a need in the art for processors configured to process masked data.

There is a need in the art for processors configured to process masked data without implementing unmasking operations of these masked data.

One embodiment addresses all or some of the drawbacks of known processors.

One embodiment provides a method for processing masked data using a processor comprising an arithmetic and logic unit, in which the masked data remain masked during their processing in the arithmetic and logic unit.

According to one embodiment, the processor further comprises an address generating unit, in which the masked data remain masked during their processing in the address generating unit.

According to one embodiment, the processor further comprises register banks, in which the masked data are stored and remain masked all throughout their storage.

According to one embodiment, the register banks comprise at least one register bank for the data and at least one register bank for masks of the data.

According to one embodiment, the processor further comprises registers storing masked pointers.

According to one embodiment, the registers store at least one masked register pointer and at least one masked program pointer.

According to one embodiment, the registers comprise pointers referencing data, and pointer masks.

According to one embodiment, the masked data can be masked according to a first and second masking type.

According to one embodiment, the first masking type only uses arithmetic operations.

According to one embodiment, a datum masked by the first masking type is equal to the addition of a datum to be masked and a mask.

According to one embodiment, the second masking type only uses logic operations.

According to one embodiment, a datum masked by the second masking type is equal to the application of the bitwise EXCLUSIVE OR operation between the datum to be masked and the mask.

According to one embodiment, the arithmetic and logic unit comprises a masking circuit configured to modify the type of masking of the masked data.

Another embodiment provides a processor configured to carry out the method previously described.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. The complete operation of a processor will not be disclosed here, the embodiments disclosed below being compatible with most of the typical operating methods of a processor.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
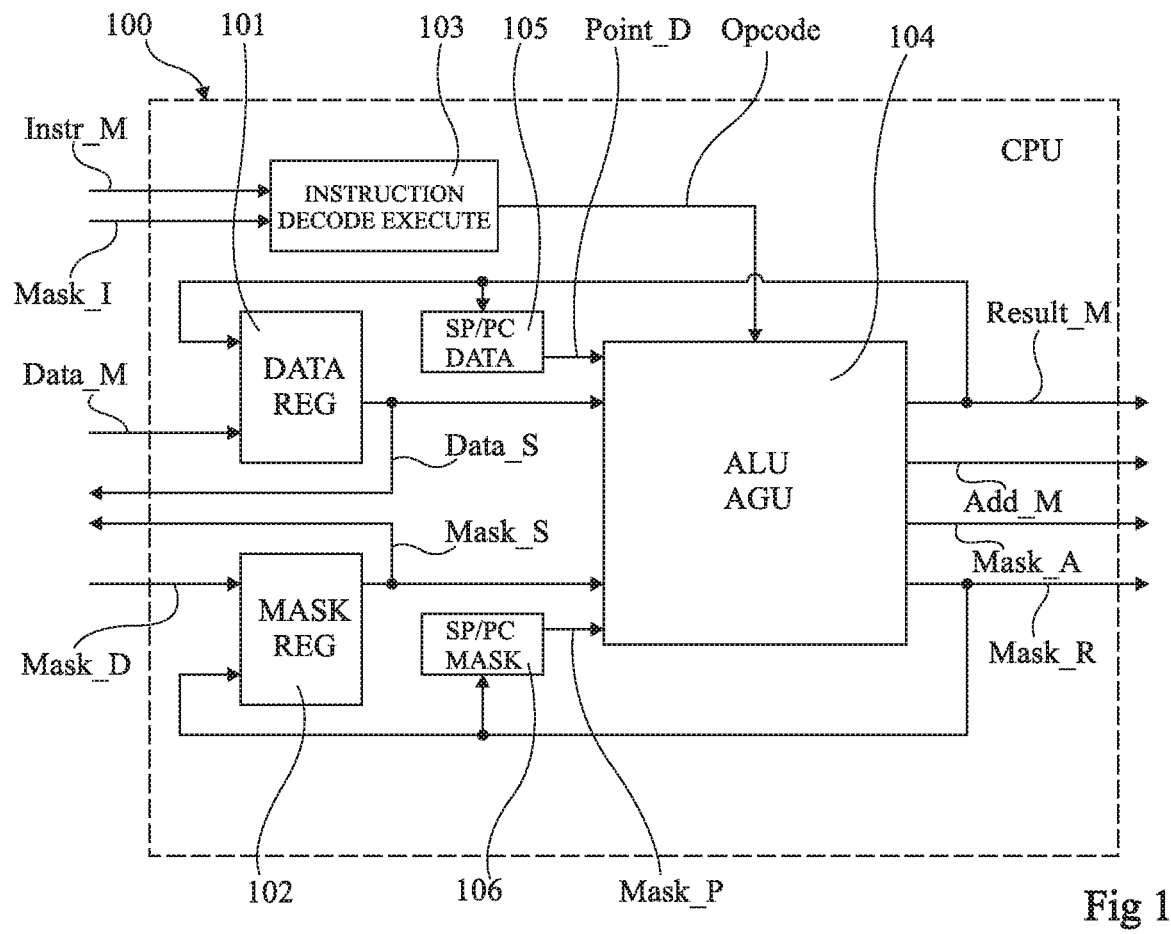
FIG. 1 shows, schematically and in block diagram form, an embodiment of a processor.

FIG. 1 shows, schematically and in block diagram form, the architecture of an embodiment of a processor 100 (CPU).

The processor 100 is a processor configured to process masked data and masked instructions. More specifically, the processor 100 receives, as input, masked data Data_M, and their masks Mask_D, and masked instructions Instr_M, and their masks Mask_I. The processor supplies as output, masked addresses Add_M, and their masks Mask_A, masked result data Result_M, and their masks Mask_R, and can also supply masked data Data_S that it stores, and their masks Mask_S. According to one embodiment variant, the processor 100 can supply directly unmasked addresses as output.

The processor 100 is made up of several electronic circuits from among the following:
- a register bank 101 (DATA REG) configured to store masked data;
- a register bank 102 (MASK REG) configured to store masked data masks stored in the register bank 101;
- a circuit 103 (INSTRUCTION DECODE EXECUTE) for decoding and executing instructions;
- an arithmetic and logic and address generating unit 104 (ALU AGU);
- registers 105 (SP/PC DATA) configured to store data and program pointers; and
- registers 106 (SP/PC MASK) configured to store pointer masks.

The register bank 101 receives, as input, the masked data Data_M or the masked results Result_M, and supplies, as output, the masked data Data_S. The register bank 101 is configured to store the masked data Data_M and the masked results Result_M during their processing by the processor 100.

The register bank 102 receives, as input, the data masks Mask_D and the result masks Mask_R, and supplies, as output, the masks Mask_S. The register bank 102 is configured to store the data masks Mask_D and the result masks Mask_R during their processing by the processor 100.

The decoding and instruction execution circuit 103 receives, as input, the masked instructions Instr_M and the instruction masks Mask_I, and supplies, as output, an operating code Opcode. The operating code Opcode is not masked. The circuit 103 unmasks the instructions Instr_M in order to determine the operating code Opcode.

The arithmetic and logic and address generating unit 104 receives, as input, the masked data Data_S, the masks Mask_S, masked data pointers Point_D, pointer masks Mask_P, and the operating code Opcode. The unit 104 supplies, as output, the masked addresses Add_M, the address masks Mask_A, the masked result data Result_M, and the result masks Mask_R. The unit 104 has two functions. A first function is that of executing the operating code Opcode by applying arithmetic and/or logic operations to the masked data Data_S and to the masks Mask_S in order to supply the masked result data Result_M and their masks Mask_R. A second function is that of executing the operating code Opcode in order to calculate the addresses Add_M and their masks Mask_A. According to a variant, the unit 104 can be made up of an arithmetic and logic unit and an address generating unit.

The registers 105 receive the masked result data Result_M as input, and supply the masked data pointers Point_D as output. The registers 105 are for example made up of a register storing a masked register pointer, or masked stack pointer (SP), and another register storing a masked program pointer (PC). The stack pointer is a pointer that references the address of the last stored datum in a register or the address of the next datum to be stored in a register. The program pointer is a pointer referencing the address of the last operating code used or the address of the next operating code to be used. In the case described here, the masked data pointers Point_D are made up of a masked register pointer referencing the address of the last datum written in memory, and a masked program pointer referencing the address of the last operating code Opcode used by the unit 104.

The registers 106 receive the result masks Mask_R as input, and supply the pointer masks Mask_P as output. The registers 106 are similar to the registers 105, but are associated with the masks. Thus, the registers 106 are for example made up of a register storing a register pointer mask, and another register storing a program pointer mask. In the case described here, the pointer masks Mask_P are the masks of the masked data pointers Point_D stored in the registers 105.

An operating mode of the processor 100 is as follows. The processor 100 receives, as input, the instructions Instr_M and the masked data to be processed Data_M, as well as their masks Mask_I and Mask_M. The instructions Instr_M are unmasked, then converted to supply the operating code Opcode by the circuit 103. The masked data Data_M and their masks Mask_M are stored, respectively in the register banks 101 and 102. The unit 104 receives the operating code Opcode and the masked data to be processed Data_S, and their masks Mask_S, as well as the masked data pointers Point_D and their masks Mask_P. The unit 104 performs different arithmetic and/or logic operations to supply the masked result data Result_M, and their masks Mask_R, and the addresses Add_M, and their masks Mask_A. The unit 104 performs all of its operations without ever performing an unmasking operation of the masked data that they process. In other words, the masked data stay masked all throughout their processing by the unit 104. A unit 104 will be disclosed in more detail in relation with FIG. 2. The masked result data Result_M can be stored in the data register bank 101, and are used to obtain the masked data pointers Point_D. The result masks Mask_R can be stored in the register bank 102, and are used to obtain the pointer masks Mask_P.

Figure 2:
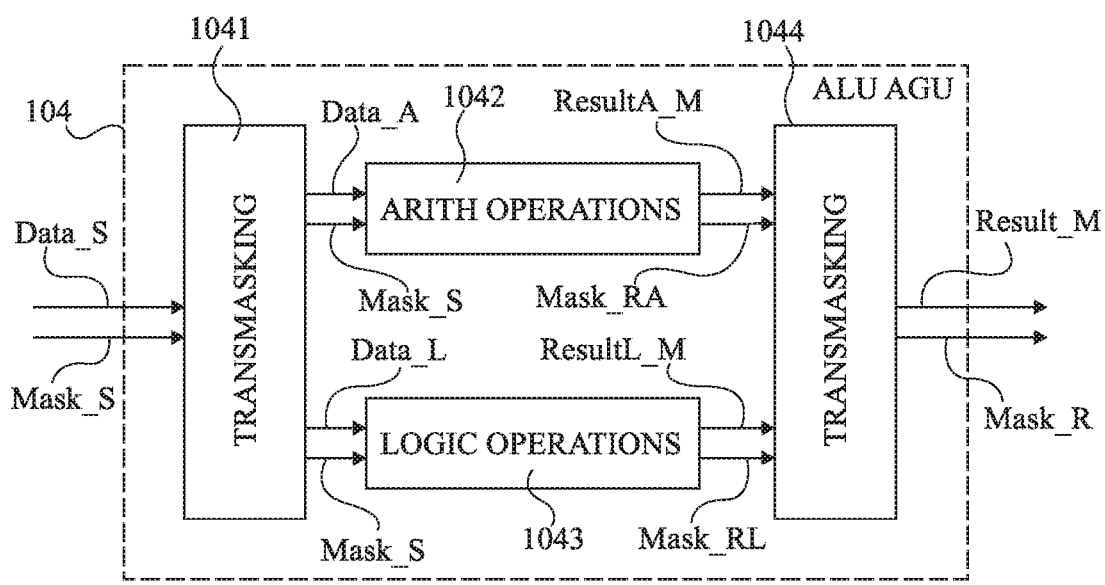
FIG. 2 shows, schematically and in block diagram form, an embodiment of an arithmetic and logic unit for generating addresses of the processor of FIG. 1.

FIG. 2 shows, schematically and in block form, more details of an example of part of the architecture of the unit 104 (ALU AGU) disclosed in relation with FIG. 1. The part disclosed here is configured to apply arithmetic and/or logic operations to the masked data Data_S and to the masks Mask_S supplied to the unit 104.

The unit 104 comprises:
- two masking circuits 1041 and 1044 (TRANSMASKING);
- circuits 1042 (ARITH OPERATIONS) configured to execute arithmetic operations; and
- circuits 1043 (LOGIC OPERATIONS) configured to execute logic operations.

The masking circuit 1041 is a circuit configured to modify the type of masking used to mask the masked data Data_S. Indeed, the masked data Data_S can be masked in two different ways. A first way of masking the masked data Data_S is to use one or several arithmetic operations to combine the datum and its mask, and thus to obtain a masked datum. As an example, the masked data Data_S are masked by using an addition operation, and more specifically, by adding the mask to the datum that one wishes to mask. A second way of masking the masked data Data_S is to use one or several logic operations to combine the datum and its mask, and thus to obtain a masked datum. As an example, the masked data Data_S are masked by using a bitwise EXCLUSIVE OR operation, and more specifically, by performing the bitwise EXCLUSIVE OR operation between the datum and its mask.

According to one preferred embodiment, the masked data stored in the register bank 101 preferably have a same type of masking. According to one embodiment, the masking type used is arithmetic masking. As a variant, these masked data can have different masking types.

The masking circuit 1041 is specifically configured to modify the type of masking used to adapt the type of masking [to] the masked datum Data_S as a function of the operations that will subsequently be applied to it. More specifically, the circuit 1041 is configured to carry out two mask conversion operations, a first operation making it possible to convert a mask of the logic type into a mask of the arithmetic type, and a second operation making it possible to convert a mask of the arithmetic type into a mask of the logic type. The two mask conversion operations do not comprise an unmasking operation of the masked data. In the example disclosed here, the two mask conversion operations do not modify the mask used; they only make it possible to modify the masked data. As a variant, the mask conversion operations could modify the masks associated with the masked data. Examples of mask conversion operations are disclosed in relation with FIGS. 3 and 4. Thus, the circuit 1041 receives the masked data Data_S and the masks Mask_S as input, and supplies masked data Data_A and their masks Mask_S, as well as masked data Data_L and their masks Mask_S, as output. The masked data Data_A are masked by an arithmetic-type mask. The masked data Data_L are masked by a logic-type mask.

The masking circuit 1044 is a circuit having functions similar the circuits of 1041. The masking circuit 1044 is different from the circuit 1041 in that it receives the masked data as input, and their masks at the output of the circuits 1042 and 1043. The masking circuit 1044 makes it possible to adapt the type of masking of the masked data that it receives for the future storage of the masked data in the registers of the register bank 101. The circuit 1044 supplies the masked result data Result_M and their masks Mask_R as output.

It should be noted that if the data arriving at the circuit 1041, or the circuit 1044, already have the masking type corresponding to the operations that are requested next, the circuits 1041 and 1044 do not modify their masking type.

The circuits 1042 receive the masked data Data_A and their masks Mask_S as input, and supply masked result data ResultA_M and their masks Mask_RA as output. The circuits 1042 are circuits implementing arithmetic operations such as addition, the calculation of a complementary, multiplication, a bit shift operation, etc. Examples of circuits allowing the implementation of these operations are disclosed in relation with FIGS. 5 to 10.

The circuits 1043 receive the masked data Data_L and their masks Mask_S as input, and supply masked result data ResultL_M and their masks Mask_RL as output. The circuits 1043 are circuits implementing logic operations such as the bitwise AND, the bitwise OR, the bitwise EXCLUSIVE OR (XOR), etc. Examples of circuits allowing the implementation of these operations are disclosed in relation with FIGS. 11 to 13.

In some cases, logic operations and arithmetic operations can be applied to perform a same instruction, thus the masked result data ResultA_M and ResultL_M can be reused during a same cycle while being re-sent to the masking circuit 1041 or to the masking circuit 1044 in order to adapt their masking type as a function of the operations that will be applied to them.

Figure 3:
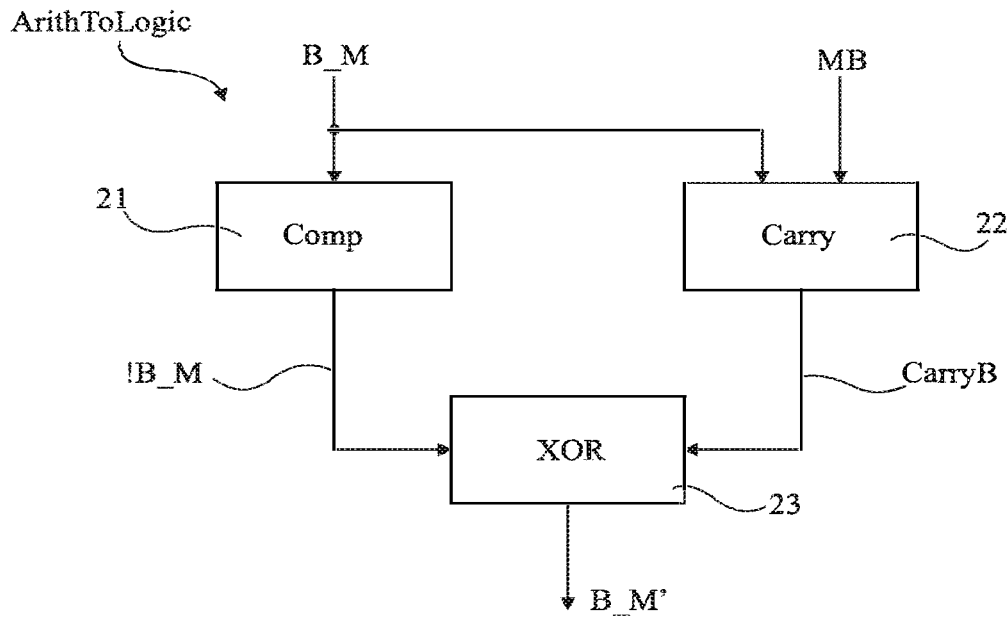
FIG. 3 shows a flowchart illustrating an operation of the unit of FIG. 2.
Figure 4:
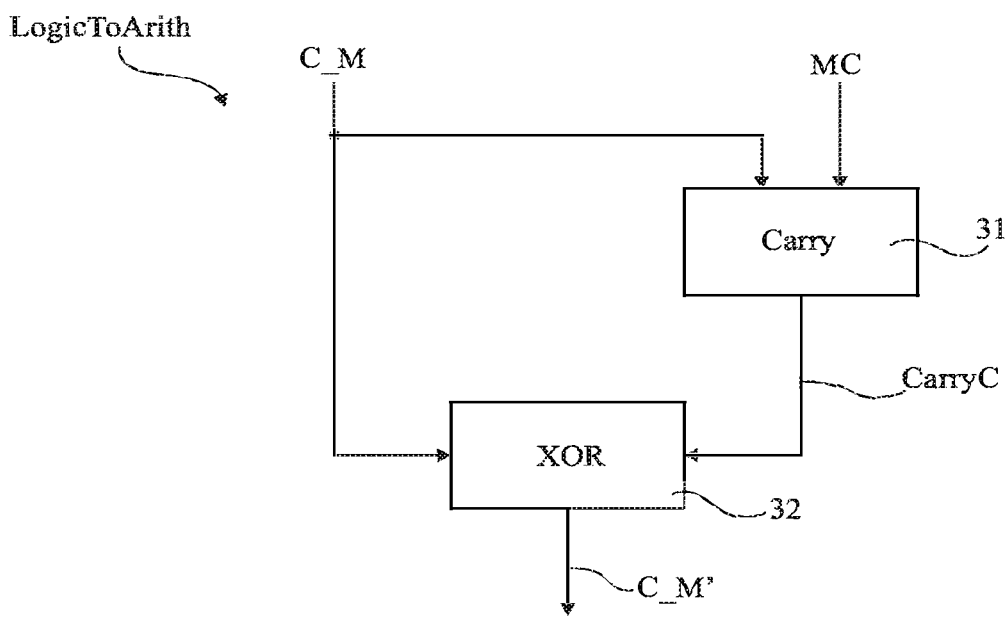
FIG. 4 shows a flowchart illustrating another operation of the unit of FIG. 2.

FIGS. 3 and 4 are flowcharts illustrating examples of masking conversion operations used in the circuit 1041 disclosed in relation to FIG. 2.

A masked datum A_M represents a datum A masked by the mask MA. The data A and A_M and the mask MA are both binary words comprising n bits, n being a natural integer. As a variant, the data A, A_M and the mask MA are binary words with different numbers of bits.

In the examples of FIGS. 3 and 4, the arithmetic masking is a masking of the additive type in which the mask is added to the datum to be masked. More specifically, a masked datum A_M is given by the following formula:

$$A\_M = (A + MA) \bmod 2^n$$

wherein:
"+" represents the addition operation; and
"mod" represents the modulo operation.

The logic masking is a masking using the bitwise EXCLUSIVE OR operation. More specifically, the masked datum A_M is given by the following formula:

$$A\_M = A \text{ xor } MA$$

in which "xor" represents the bitwise EXCLUSIVE OR operation.

FIG. 3 illustrates a masking conversion operation ArithToLogic of a masked datum resulting from an arithmetic masking operation into a masked datum resulting from a logic masking operation.

A datum B_M represents a datum B masked by a mask MB with an arithmetic masking operation. The data B and B_M and the mask MB are both binary words comprising n bits, n being a natural integer.

The operation ArithToLogic uses the masked datum B_M and its mask MB as input, and supplies the new masked datum B_M' as output. The datum B_M' represents the datum B masked by a mask MB with a logic masking operation.

In a step 21 (Comp), the complementary !B_M of the masked datum B_M is computed. This step does not require the use of the datum B; an exemplary circuit implementing this operation is disclosed in relation with FIG. 6.

In a step 22 (Carry), a carry digit CarryB is computed from the masked datum B_M and the mask MB. More specifically, the carry digit CarryB is given by the following formula:

$$\begin{cases} CarryB[i] = B\_M[i] \cdot !\,MB[i] + CarryB[i-1] \cdot (B\_M[i]\ xor\ !\,MB[i]) \\ \qquad\qquad CarryB[0] = 1 \end{cases}$$

wherein:
"i" is a natural integer varying from 0 to n−1;
"x[i]" represents the bit of rank i of the binary word x;
"." represents the bitwise AND logic operation; and
"!x" represents the complementary of the binary word x.

Step 22 does not require the use of the unmasked datum B. Examples of circuits configured to carry out the operations used by this formula are disclosed in relation with FIGS. 5 to 13. Steps 21 and 22 can, as an example, be done simultaneously.

In a step 23 (XOR), the new masked datum B_M' is computed by performing the following operation:

$$B\_M' = B\_M\ xor\ CarryB$$

Figure 13:
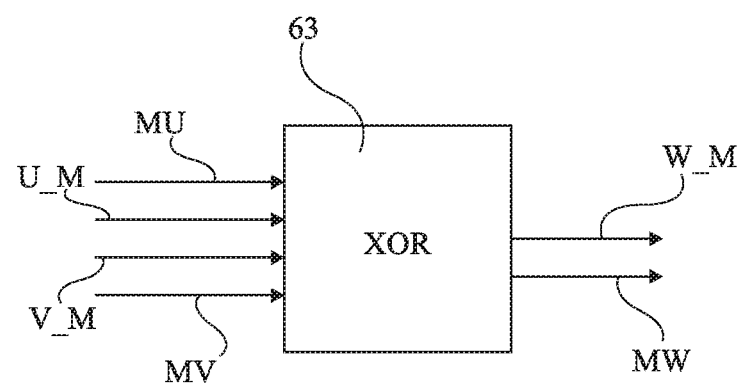
FIG. 13 shows, schematically and in block diagram form, an embodiment of logic circuit for calculating a bitwise EXCLUSIVE OR logic.

An exemplary circuit carrying out the bitwise EXCLUSIVE OR operation is disclosed in relation to FIG. 13.

One advantage of the ArithToLogic operation is that it does not use the unmasked datum B to convert the datum B_M into the datum B_M'.

FIG. 4 illustrates a masking conversion operation ArithToLogic of a datum masked with a logic mask into a datum masked with an arithmetic mask.

A datum C_M represents a datum C masked by the mask MC by a logic masking operation. The data C and C_M and the mask MC are all binary words comprising n bits.

The operation LogicToArith uses the masked datum C_M and its mask MC as input, and supplies the new masked datum C_M' as output. The datum C_M' represents a datum C masked by the mask MC by an arithmetic masking operation.

In a step 31 (Carry), a carry digit CarryC is computed from the masked datum C_M and the mask MC. More specifically, the carry digit CarryC is given by the following formula:

$$\begin{cases} CarryC[i] = !\,C\_M[i] \cdot MC[i] + CarryC[i-1] \cdot C\_M[i] \\ \qquad\qquad CarryC[0] = 0 \end{cases}$$

In a step 32 (XOR), the new masked datum C_M' is computed by performing, bitwise, the following operation:

$$C\_M' = C\_M\ xor\ CarryC$$

One advantage of the LogicToArith operation is that it does not use the unmasked datum C to convert the datum C_M into the datum C_M'.

FIGS. 5 to 10 show examples of circuits configured to carry out arithmetic operations of the circuits 1042 disclosed in relation with FIG. 2.

In the examples disclosed in these figures, the arithmetic masking operation is identical to that disclosed in relation with FIGS. 3 and 4.

Figure 5:
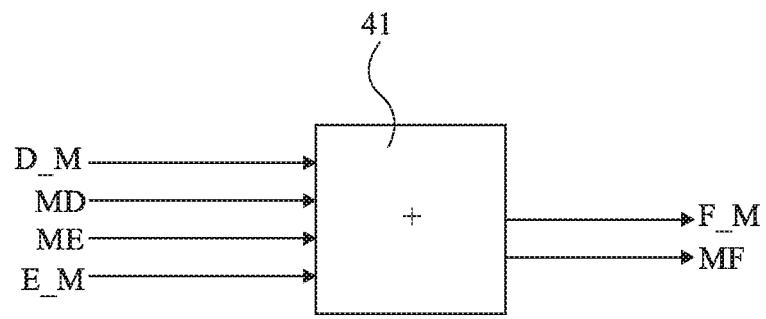
FIG. 5 shows, schematically and in block diagram form, an embodiment of an addition logic circuit.

FIG. 5 shows, schematically and in block diagram form, a logic circuit configured to implement an additional operation symbolized by a block 41 (+).

In the example shown in FIG. 5, the additional operation uses two masked data D_M and E_M, and their masks MD and ME, as input, and supplies a masked datum F_M and its mask MF as output. The datum D_M, respectively E_M, F_M, is the result of the arithmetic masking of a datum D, respectively E, F, by the mask MD, respectively ME, MF. The masked datum F_M and the mask MF are given by the following relationships:

$$\begin{cases} F\_M = D\_M + E\_M \\ MF = MD + ME \end{cases}$$

As a variant, the addition operation could comprise more input data.

One advantage of this operation is that the data D and E are not necessary to compute the masked datum F_M.

Figure 6:
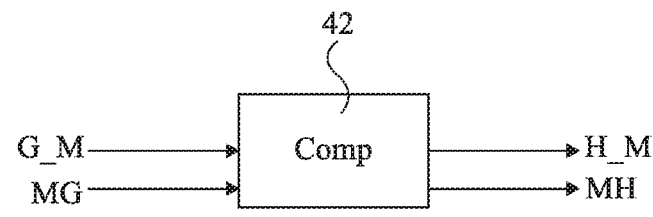
FIG. 6 shows, schematically and in block diagram form, another embodiment of a logic circuit for calculating a complementary.

FIG. 6 shows, schematically and in block diagram form, a logic circuit 42 (Comp) configured to implement an operation to compute a complementary to 1.

In the example shown in FIG. 6, the operation to compute a complementary to 1 comprises a masked datum G_M and its mask MG as input, and supplies a masked datum H_M and its mask MH as output. The datum G_M, respectively H_M, is the result of the arithmetic masking of a datum G, respectively H, by the mask MG, respectively MH. The masked datum H_M and the mask MH are given by the following relationships:

$$\begin{cases} H\_M = !\,G\_M \\ MH = !\,MG + 1 \end{cases}$$

One advantage of this operation is that the datum G is not necessary to compute the masked datum H_M.

According to one embodiment variant, the masked datum H_M and the mask MH are given by the following relationships:

$$\begin{cases} H\_M = !\,G\_M - 1 \\ MH = !\,MG \end{cases}$$

wherein "−" represents the subtraction operation.

Figure 7:
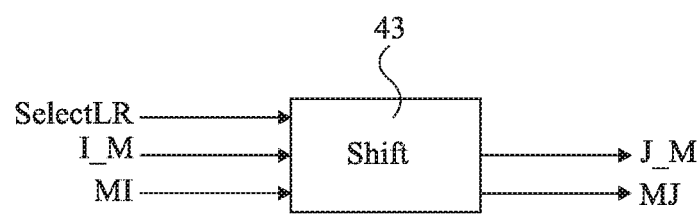
FIG. 7 shows, schematically and in block diagram form, another embodiment of a logic circuit for bit shifting in a binary word.

FIG. 7 shows, schematically and in block diagram form, a logic circuit 43 (Shift) configured to implement a bit shifting operation.

In the example shown in FIG. 7, the bit shifting operation comprises a masked datum I_M and its mask MI as input, and supplies a masked datum J_M and its mask MJ as output. The datum I_M, respectively J_M, is the result of the arithmetic masking of a datum I, respectively J, by the mask MI, respectively MJ. The binary words I_M, J_M, I, J, MI, MJ are for example binary words with n bits, n being a natural integer. The bit shifting operation further uses, as input, a binary word SelectLR indicating to it whether the performed operation is a bit shift to the right or to the left. The masked datum J_M and the mask MJ are, in the case of a bit shift to the left, given by the following relationships:

$$\begin{cases} J\_M = (I\_M * 2^m) \bmod 2^n \\ MJ = (MI * 2^m) \bmod 2^n \end{cases}$$

wherein "*" represents the multiplication operation.
wherein m is the desired shift of the bits of the masked datum as input, m being a natural integer less than or equal to n.

One advantage of this operation is that the datum I is not necessary to compute the masked datum J_M.

Figure 8:
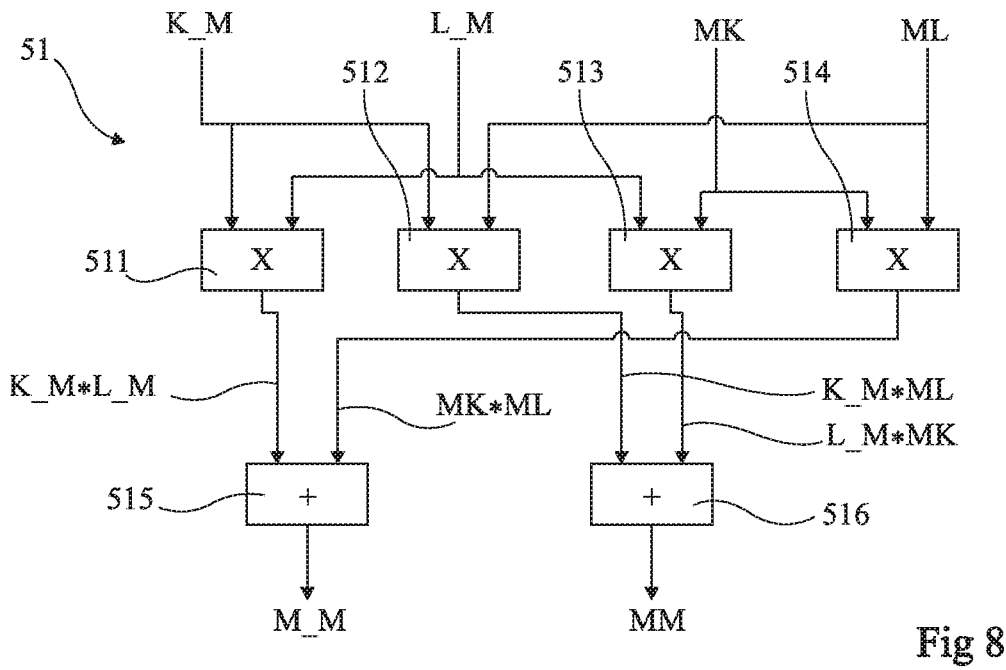
FIG. 8 shows, schematically and in block diagram form, an embodiment of a multiplication logic circuit.
Figure 9:
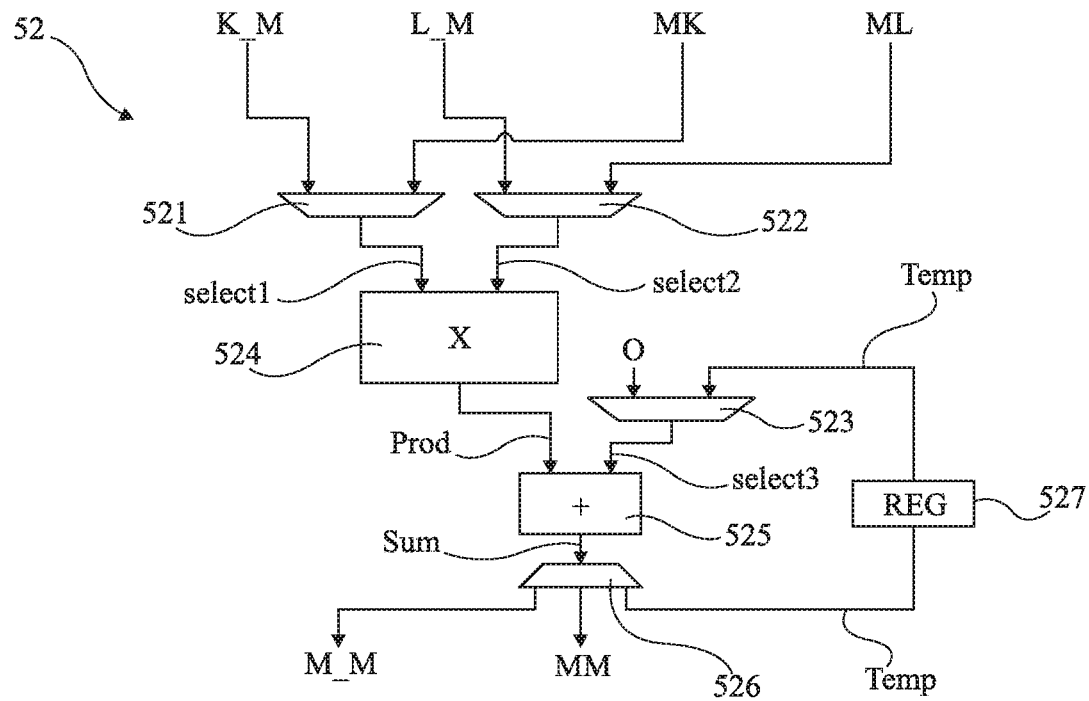
FIG. 9 shows, schematically and in block diagram form, another embodiment of a multiplication logic circuit.

FIGS. 8 and 9 show, schematically and in block diagram form, embodiments of logic circuits configured to implement a multiplication operation.

The multiplication operation uses, as input, two masked data K_M and L_M and their respective masks MK and ML, and supplies, as output, a masked datum M_M and its mask MM. The datum K_M, respectively L_M, M_M is the result of the arithmetic masking of the datum K, respectively L, M by the mask MK, respectively ML, MM. The binary words K_M, L_M, M_M, K, L, M, MK, ML, and MM are binary words with n bits, n being a natural integer. The masked datum M_M and the mask MM are for example given by the following formulas:

$$\begin{cases} M\_M = (K\_M * L\_M + MK * ML) \bmod 2^n \\ MM = (K\_M * ML + L\_M * MK) \bmod 2^n \end{cases}$$

Other expressions of the masked datum M_M and the mask MM can be considered.

FIG. 8 shows a circuit 51 implementing the multiplication operation. The circuit 51 comprises:
 four multiplication circuits 511, 512, 513 and 514 (X); and
 two addition circuits 515 and 516 (+).

The multiplication circuit 511 receives, as input, the masked datum K_M and the masked datum L_M, and supplies, as output, the multiplication of these data K_M*L_M.

The multiplication circuit 512 receives, as input, the masked datum K_M and the mask ML, and supplies, as output, the result K_M*ML of this multiplication.

The multiplication circuit 513 receives, as input, the masked datum L_M and the mask MK, and supplies, as output, the result L_M*MK of this multiplication.

The multiplication circuit 514 receives, as input, the mask MK and the mask ML, and supplies, as output, the result MK*ML of this multiplication.

The addition circuit 515 receives, as input, the result K_M*L_M of the multiplication of the circuit 511 and the result MK*ML of the multiplication of the circuit 514, and supplies, as output, the masked datum M_M.

The addition circuit 516 receives, as input, the result K_M*ML of the multiplication of the circuit 512 and the result M_L*MK of the multiplication of the circuit 513, and supplies, as output, the mask MM.

One advantage of the circuit 51 is that it does not use the unmasked data K and L to compute the masked datum M_M and its mask MM.

Another advantage of the circuit 51 is that it makes it possible to carry out a multiplication operation of two masked data in a single clock cycle.

FIG. 9 shows a circuit 52 implementing the multiplication operation. The circuit 52 comprises:
 three selectors 521, 522 and 523;
 one multiplication circuit 524 (X);
 one addition circuit 525 (+);
 a switching circuit 526; and
 a register 527 (REG).

The selector 521 receives, as input, the masked datum K_M and the mask MK, and supplies, as output, a first binary word select1.

The selector 522 receives, as input, the masked datum L_M and the mask ML, and supplies, as output, a second binary word select2.

The multiplication circuit 524 receives, as input, the two binary words select1 and select2, and supplies, as output, the result Prod of this multiplication.

The selector 523 receives, as input, the binary word corresponding to zero (0), next called nil datum, and a time delay datum Temp, and supplies, as output, a third binary word select3.

The addition circuit 525 receives, as input, the result Prod of the multiplication and the binary word select3, and supplies, as output, the result Sum of this addition.

The switching circuit 526 receives, as input, the result Sum of the addition circuit 525 and uses, as output, this result Sum to form either the masked datum M_M, the mask MM or the time delay datum Temp.

The register 527 receives the time delay datum Temp as input, and supplies this same time delay datum Temp as output. The register 527 makes it possible to store the time delay datum Temp between the different cycles of the operation.

The circuit 52 makes it possible to perform the multiplication operation by using four clock cycles. Examples of computing steps used during the four clock cycles are as follows.

In a first clock cycle, the selector 521 selects the masked datum K_M, and the binary word select1 is then equal to the masked datum K_M. The selector 522 selects the masked datum L_M, and the binary word select2 is then equal to the masked datum L_M. The multiplication circuit 524 supplies the result Prod of the product of the binary words select1 and select2. The result Prod is then equal to the product of the masked datum K_M by the masked datum L_M. The selector 523 selects the nil datum, and the binary word select3 is then equal to the nil datum. The addition circuit 525 supplies the result Sum of the sum of the product Prod and of the binary word select3. The result Sum is then equal to the product of the masked datum K_M by the masked datum L_M. The switching circuit 526 supplies the result Sum to the time delay datum Temp in order to store it in the register 527.

In a second clock cycle, the selector 521 selects the mask MK, and the binary word select1 is then equal to the mask MK. The selector 522 selects the mask ML, and the binary word select2 is then equal to the mask ML. The multiplication circuit 524 supplies the result Prod of the product of the binary words select1 and select2. The result Prod is then equal to the product of the mask MK and the mask ML. The selector 523 selects the time delay datum Temp from the register 527, and the binary word select3 is then equal to the time delay datum Temp. The addition circuit 525 supplies the result Sum of the sum of the product Prod and of the binary word select3. The result Sum is then equal to:

Sum=K_M*L_M+MK*ML

The switching circuit 526 supplies the result Sum to the masked datum M_M.

In a third clock cycle, the selector 521 selects the masked datum K_M, and the binary word select1 is then equal to the masked datum K_M. The selector 522 selects the mask ML, and the binary word select2 is then equal to the mask ML. The multiplication circuit 524 supplies the result Prod of the product of the binary words select1 and select2. The result Prod is then equal to the product of the masked datum K_M by the mask ML. The selector 523 selects the nil datum, and the binary word select3 is then equal to the nil datum. The addition circuit 525 supplies the result Sum of the sum of the product Prod and of the binary word select3. The result Sum is then equal to the product of the masked datum K_M by the mask ML. The switching circuit 526 supplies the result Sum to the time delay datum Temp in order to store it in the register 527.

In a fourth clock cycle, the selector 521 selects the masked datum L_M, and the binary word select1 is then equal to the masked datum L_M. The selector 522 selects the mask MK, and the binary word select2 is then equal to the mask MK. The multiplication circuit 524 supplies the result Prod of the product of the binary words select1 and select2. The result Prod is then equal to the product of the masked datum L_M and the mask MK. The selector 523 selects the time delay datum Temp, and the binary word select3 is then equal to the time delay datum Temp. The addition circuit 525 supplies the result Sum of the sum of the product Prod and of the binary word select3. The result Sum is then equal to:

$$\text{Sum}=K\_M*ML+L\_M*MK$$

The switching circuit 526 supplies the result Sum to the mask MM.

One advantage of the circuit 52 is that it makes it possible to implement a multiplication operation by using a single multiplication circuit and a single addition circuit. The circuit 52 can then have a smaller bulk.

Figure 10:
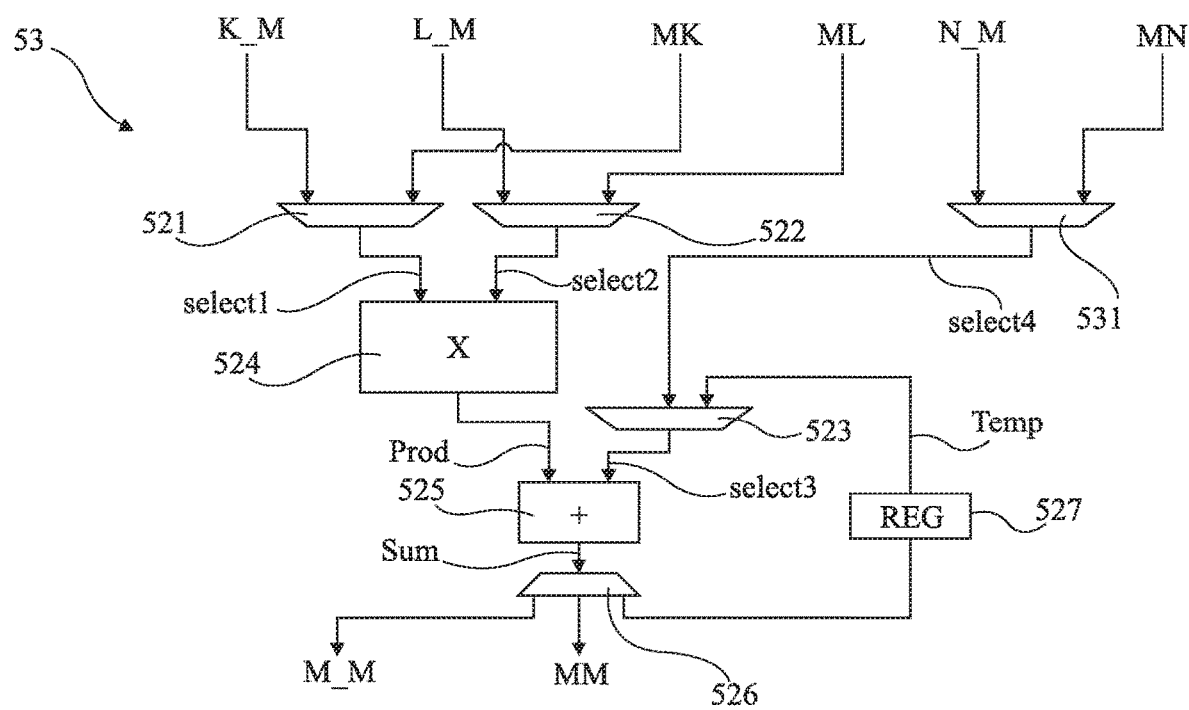
FIG. 10 shows, schematically and in block diagram form, another embodiment of a multiplication logic circuit.

FIG. 10 shows, schematically and in block diagram form, an embodiment of an addition logic circuit configured to implement a multiply accumulate operation (MAC). FIG. 10 more specifically shows a circuit 53.

The multiply accumulate operation uses, as input, the two masked data K_M and L_M and their respective masks MK and ML, and a masked datum N_M and its mask MN. The operation supplies, as output, the masked datum M_M and its mask MM. The datum N_M is the result of the arithmetic masking of a datum N, by the mask MN. The binary words N_M, N and MN are for example binary words with n bits, n being a natural integer. The multiply accumulate operation is defined by the following formula:

$$M=K*L+N$$

The datum M_M and the mask MM are given by the following formulas:

$$\begin{cases} M\_M = (K\_M*L\_M + MK*ML + N\_M) \mod 2^n \\ MM = (K\_M*ML + L\_M*MK + MN) \mod 2^n \end{cases}$$

Other expressions of the masked datum M_M and the mask MM could be considered.

The circuit 53 of FIG. 10 comprises common elements with the circuit 52 of FIG. 9. Hereinafter, these like elements will not be described in detail again, and only the differences between the two circuits 52 and 53 will be highlighted. The circuit 52 comprises:
- four selectors 521, 522, 523 and 531;
- the multiplication circuit 524;
- the addition circuit 525;
- the switching circuit 526; and
- the register 527.

The difference between the circuit 53 and the circuit 52 is that, in the circuit 53, the selector 523 receives not the nil datum, but a binary word select4 and the time delay datum Temp.

The binary word select4 is an output of the selector 531. The selector 531 receives, as input, the masked datum N_M and its mask MN.

The circuit 53 makes it possible to perform the multiply accumulate operation by using four clock cycles. Examples of computing steps used during the four clock cycles are as follows.

In a first clock cycle, the selector 521 selects the masked datum K_M, and the binary word select1 is then equal to the masked datum K_M. The selector 522 selects the masked datum L_M, and the binary word select2 is then equal to the masked datum L_M. The multiplication circuit 524 supplies the result Prod of the product of the binary words select1 and select2. The result Prod is then equal to the product of the masked datum K_M by the masked datum L_M. The selector 531 selects the masked datum N_M, and the binary word select4 is then equal to the masked datum N_M. The selector 523 selects the binary word select4, and the binary word select3 is then equal to the masked datum N_M. The addition circuit 525 supplies the result Sum of the sum of the product Prod and of the binary word select3. The result Sum is then given by the following formula:

$$\text{Sum}=K\_M*L\_M+N\_M$$

The switching circuit 526 supplies the result Sum to the time delay datum Temp by storing it in the register 527.

In a second clock cycle, the selector 521 selects the mask MK, and the binary word select1 is then equal to the mask MK. The selector 522 selects the mask ML, and the binary word select2 is then equal to the mask ML. The multiplication circuit 524 supplies the result Prod of the product of the binary words select1 and select2. The result Prod is then equal to the product of the mask MK and the mask ML. The selector 523 selects the time delay datum Temp stored in the register 527, and the binary word select3 is then equal to the time delay datum Temp. The addition circuit 525 supplies the result Sum of the sum of the product Prod and of the binary word select3. The result Sum is then equal to:

$$\text{Sum}=K\_M*L\_M+MK*ML+N\_M$$

The switching circuit 526 supplies the result Sum to the masked datum M_M.

In a third clock cycle, the selector 521 selects the masked datum K_M, and the binary word select1 is then equal to the masked datum K_M. The selector 522 selects the mask ML, and the binary word select2 is then equal to the mask ML. The multiplication circuit 524 supplies the result Prod of the product of the binary words select1 and select2. The result Prod is then equal to the product of the masked datum K_M by the mask ML. The selector 531 selects the mask MN, and the binary word select4 is then equal to the mask MN. The selector 523 selects the binary word select4, and the binary word select3 is then equal to the mask MN. The addition circuit 525 supplies the result Sum of the sum of the product Prod and of the binary word select3. The result Sum is then equal to:

$$\text{Sum}=K\_M*ML+MN$$

The switching circuit 526 supplies the result Sum to the time delay datum Temp.

In a fourth clock cycle, the selector 521 selects the masked datum L_M, and the binary word select1 is then equal to the masked datum L_M. The selector 522 selects the mask MK, and the binary word select2 is then equal to the mask MK. The multiplication circuit 524 supplies the result Prod of the product of the binary words select1 and select2. The result Prod is then equal to the product of the masked datum L_M and the mask MK. The selector 523 selects the time delay datum Temp, and the binary word select3 is then equal to the time delay datum Temp. The addition circuit 525 supplies the result Sum of the sum of the product Prod and of the binary word select3. The result Sum is then equal to:

$$Sum = KM*ML + L\_M*MK + MN$$

The switching circuit 526 supplies the result Sum to the mask MM.

As a variant, the selector 523 could further receive the nil datum, to be able to perform a multiplication operation like that disclosed in relation with FIG. 9.

One advantage of the circuit 53 is that it makes it possible to implement a multiply accumulate operation by using a single multiplication circuit and a single addition circuit. The circuit 53 can then have a smaller bulk.

Another advantage of the circuit 53 is that it makes it possible to perform a multiply accumulate operation without using the unmasked data K, L and N.

Figure 11:
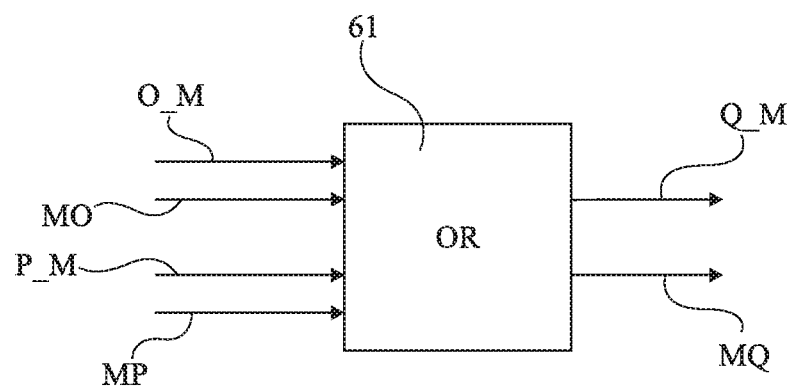
FIG. 11 shows, schematically and in block diagram form, another embodiment of a logic circuit for calculating a bitwise OR logic.
Figure 12:
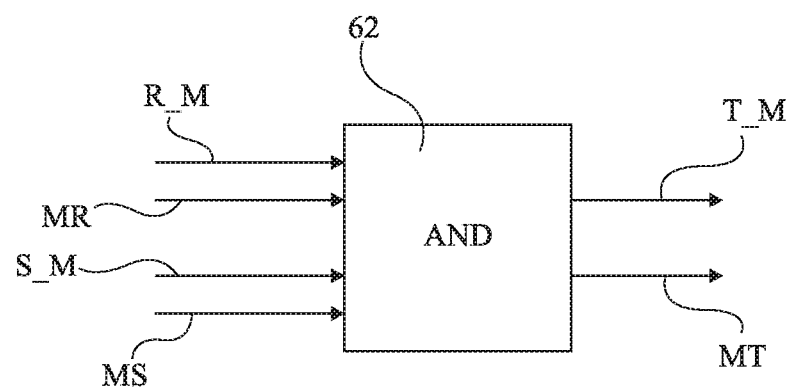
FIG. 12 shows, schematically and in block diagram form, an embodiment of logic circuit for calculating a bitwise AND logic.

FIGS. 11 to 13 show examples of circuits configured to carry out logic operations of the circuits 1043 disclosed in relation with FIG. 2.

In the examples disclosed in these figures, the logic masking operation is identical to that disclosed in relation with FIGS. 3 and 4.

Figure ii shows, schematically and in block diagram form, a logic circuit 61 (OR) configured to implement a bitwise OR logic operation.

In the example shown in FIG. 11, the bitwise OR logic operation uses two masked data O_M and P_M, and their respective masks MO and MP, as input, and supplies a masked datum Q_M and its mask MQ as output. The masked datum O_M, respectively P_M, Q_M, is the result of the logic masking of a datum O, respectively P, Q, by a mask MO, respectively MP, MQ. The masked datum Q_M and its mask MQ are given by the following relationships, executed bitwise:

$$\begin{cases} Q\_M = !O\_M \cdot P\_M \cdot MP \text{ or } !P\_M \cdot MO \cdot MP \text{ or } P\_M \cdot !MO \cdot !MP \text{ or } O\_M \cdot !P\_M \cdot !MP \\ MQ = MO \text{ xor } MP \end{cases}$$

wherein "or" designates the bitwise OR logic operation.

The circuit 61 can be implemented by using, for example, an OR gate with four inputs, and four AND gates with three inputs.

One advantage of the circuit 61 is that it does not use the unmasked data O and P to compute the masked datum Q_M.

FIG. 12 shows, schematically and in block diagram form, a logic circuit 62 (AND) configured to implement a bitwise AND logic operation.

In the example shown in FIG. 12, the bitwise AND logic operation uses two masked data R_M and S_M, and their respective masks MR and MS, as input, and supplies a masked datum T_M and its mask MT as output. The masked datum R_M, respectively S_M, T_M, is the result of the logic masking of a datum R, respectively S, T, by a mask MR, respectively MS, MT. The masked datum T_M and the mask MT are given by the following relationships:

$$\begin{cases} T\_M = !R\_M \cdot !R\_M \cdot MS \text{ or } !S\_M \cdot MR \cdot !MS \text{ or } S\_M \cdot !MR \cdot MS \text{ or } R\_M \cdot S\_M \cdot !MS \\ MT = MR \text{ xor } MS \end{cases}$$

The circuit 62 can be implemented by using, for example, an OR gate with four inputs, and four AND gates with three inputs. As an example, the circuits 61 and 62 of FIGS. 11 and 12 can be implemented by similar circuits.

One advantage of the circuit 62 is that it does not use the unmasked data R and S to compute the masked datum T_M.

FIG. 13 shows, schematically and in block diagram form, a logic circuit 63 (XOR) configured to implement a bitwise EXCLUSIVE OR logic operation.

In the example shown in FIG. 13, the bitwise EXCLUSIVE OR logic operation uses two masked data U_M and V_M, and their respective masks MU and MV, as input, and supplies a masked datum W_M and its mask MW as output. The masked datum U_M, respectively V_M, W_M, is the result of the logic masking of a datum U, respectively V, W, by a mask MU, respectively MV, MW. The masked datum W_M and the mask MW are given by the following relationships:

$$\begin{cases} W\_M = U\_M \text{ xor } V\_M \\ MW = MU \text{ xor } MV \end{cases}$$

One advantage of the circuit 62 is that it does not use the unmasked data U and V to compute the masked datum W_M.

Various embodiments and variants have been described. Those skilled in the art will understand that certain features of these embodiments can be combined and other variants will readily occur to those skilled in the art. In particular, other arithmetic and logic operations may be considered. Additionally, the examples of logic and arithmetic masking mentioned in the disclosure are only examples, and other masking operations may be considered.

Additionally, another example of a part of the architecture of the arithmetic and logic unit 104 could be to comprise a first masking circuit in front of the circuits implementing the logic operations and a second masking circuit in front of the circuits implementing the arithmetic operations, each masking circuit making it possible to adapt the type of masking before the requested operation.

Finally, the practical implementation of the embodiments and variants described herein is within the capabilities of those skilled in the art based on the functional description provided hereinabove.

What is claimed is:

1. A method of operating an arithmetic and logic unit of a central processing unit (CPU), the method comprising:
    receiving, by an arithmetic-to-logic circuit of an input masking circuit, first arithmetic-masked input data and first input masks;
    generating, by a complementary circuit of the arithmetic-to-logic circuit, masked complementary data from the first arithmetic-masked input data;
    generating, by a first carry circuit of the arithmetic-to-logic circuit, arithmetic carry digits from the first arithmetic-masked input data and the first input masks;
    generating, by a first exclusive-OR circuit of the arithmetic-to-logic circuit, first logic-masked input data from the masked complementary data and the arithmetic carry digits;
    generating, by a second carry circuit of a logic-to-arithmetic circuit, logic carry digits from second logic-masked input data and second input masks;

generating, by a second exclusive-OR circuit of the logic-to-arithmetic circuit, second arithmetic-masked input data from the second logic-masked input data and the logic carry digits;

applying, by an arithmetic circuit, arithmetic operations to the first arithmetic-masked input data, the first input masks, the second arithmetic-masked input data, and the second input masks to generate intermediate arithmetic-masked result data and first intermediate result masks;

applying, by a logic circuit, logic operations to the first logic-masked input data, the first input masks, the second logic-masked input data, and the second input masks to generate intermediate logic-masked result data and second intermediate result masks;

generating, by an output masking circuit, final masked result data and final result masks from the intermediate arithmetic-masked result data, the first intermediate result masks, the intermediate logic-masked result data, and the second intermediate result masks; and keeping, by the arithmetic and logic unit, the first arithmetic-masked input data, the first logic-masked input data, the second arithmetic-masked input data, the second logic-masked input data, the masked complementary data, the intermediate arithmetic-masked result data, the intermediate logic-masked result data, and the final masked result data masked throughout processing of the first arithmetic-masked input data, the first logic-masked input data, the second arithmetic-masked input data, the second logic-masked input data, the masked complementary data, the intermediate arithmetic-masked result data, the intermediate logic-masked result data, and the final masked result data in the arithmetic and logic unit.

2. The method according to claim 1, further comprising:
calculating, by an address generating unit of the CPU, a masked address of the final masked result data and an associated address mask.

3. The method according to claim 1, further comprising storing, in register banks of the CPU, the first arithmetic-masked input data, the first logic-masked input data, the second arithmetic-masked input data, and the second logic-masked input data.

4. The method according to claim 3, wherein the register banks comprise at least one first register bank for the first arithmetic-masked input data, the first logic-masked input data, the second arithmetic-masked input data, and the second logic-masked input data, and at least one second register bank for the first input masks and the second input masks.

5. The method according to claim 1, further comprising storing, in registers of the CPU, masked pointers.

6. The method according to claim 5, further comprising storing, in the registers, at least one masked register pointer and at least one masked program pointer.

7. The method according to claim 5, wherein the masked pointers stored in the registers comprise pointers referencing data, and pointer masks.

8. The method according to claim 1, wherein the first arithmetic-masked input data is equal to an addition of a first datum to be masked and an associated first input mask.

9. The method according to claim 1, wherein the first logic-masked input data is equal to a bitwise EXCLUSIVE OR of a first datum to be masked and an associated first input mask, and the second logic-masked input data is equal to a bitwise EXCLUSIVE OR of a second datum to be masked and an associated second input mask.

10. The method according to claim 1, further comprising converting, by a second arithmetic-to-logic circuit in the output masking circuit, the intermediate arithmetic-masked result data to final logic-masked result data.

11. The method according to claim 1, further comprising converting, by a second logic-to-arithmetic circuit in the output masking circuit, the intermediate logic-masked result data into final arithmetic-masked result data.

12. A central processing unit (CPU) comprising:
an arithmetic and logic unit comprising:
an input masking circuit comprising:
an arithmetic-to-logic circuit comprising:
a complementary circuit configured to receive first arithmetic-masked input data, and to generate masked complementary data;
a first carry circuit configured to receive the first arithmetic-masked input data and first input masks, and to generate arithmetic carry digits; and
a first exclusive-OR circuit coupled to the complementary circuit and the first carry circuit, and configured to generate first logic-masked input data; and
a logic-to-arithmetic circuit comprising:
a second carry circuit configured to receive second logic-masked input data and second input masks, and to generate logic carry digits; and
a second exclusive-OR circuit coupled to the second carry circuit, and configured to receive the second logic-masked input data and to generate second arithmetic-masked input data;
an arithmetic circuit coupled to the input masking circuit, and configured to apply arithmetic operations to the first arithmetic-masked input data, the first input masks, the second arithmetic-masked input data, and the second input masks to generate intermediate arithmetic-masked result data and first intermediate result masks;
a logic circuit coupled to the input masking circuit, and configured to apply logic operations to the first logic-masked input data, the first input masks, the second logic-masked input data, and the second input masks to generate intermediate logic-masked result data and second intermediate result masks; and
an output masking circuit coupled to the arithmetic circuit and the logic circuit, and configured to generate final masked result data and final result masks;
wherein the arithmetic and logic unit is configured to keep the first arithmetic-masked input data, the first logic-masked input data, the second arithmetic-masked input data, the second logic-masked input data, the masked complementary data, the intermediate arithmetic-masked result data, the intermediate logic-masked result data, and the final masked result data masked throughout processing of the first arithmetic-masked input data, the first logic-masked input data, the second arithmetic-masked input data, the second logic-masked input data, the masked complementary data, the intermediate arithmetic-masked result data, the intermediate logic-masked result data, and the final masked result data in the arithmetic and logic unit.

13. The CPU according to claim 12, wherein the arithmetic and logic unit is further configured to:
calculate a masked address of the final masked result data and an associated address mask.

14. The CPU according to claim 12, wherein the CPU further comprises register banks configured to store the first arithmetic-masked input data, the first logic-masked input data, the second arithmetic-masked input data, and the second logic-masked input data.

15. The CPU according to claim 14, wherein the register banks comprise at least one first register bank for the first arithmetic-masked input data, the first logic-masked input data, the second arithmetic-masked input data, and the second logic-masked input data, and at least one second register bank for the first input masks and the second input masks.

16. The CPU according to claim 14, wherein the CPU further comprises registers configured to store masked pointers.

17. The CPU according to claim 16, wherein the registers are configured to store at least one masked register pointer and at least one masked program pointer.

18. The CPU according to claim 16, wherein the masked pointers stored in the registers comprise pointers referencing data, and pointer masks.

19. The CPU according to claim 12, wherein the first arithmetic-masked input data is equal to an addition of a first datum to be masked and an associated first input mask, and the second arithmetic-masked input data is equal to an addition of a second datum to be masked and an associated second input mask.

20. The CPU according to claim 12, wherein the first logic-masked input data is equal to a bitwise EXCLUSIVE OR of a first datum to be masked and an associated first input mask, and the second logic-masked input data is equal to a bitwise EXCLUSIVE OR of a second datum to be masked and an associated second input mask.

21. The CPU according to claim 12, wherein the output masking circuit comprises:
 a second arithmetic-to-logic circuit coupled to the arithmetic circuit; and
 a second logic-to-arithmetic circuit coupled to the logic circuit.

22. The CPU according to claim 21, wherein the second arithmetic-to-logic circuit is configured to convert the intermediate arithmetic-masked result data to final logic-masked result data.

23. The CPU according to claim 21, wherein the second logic-to-arithmetic circuit is configured to convert the intermediate logic-masked result data to final arithmetic-masked result data.

* * * * *